(12) United States Patent
Bennett et al.

(10) Patent No.: US 9,976,724 B2
(45) Date of Patent: May 22, 2018

(54) LIGHTING DEVICE CONSTRUCTION

(71) Applicant: Energizer Brands, LLC

(72) Inventors: Jason Bennett, Sydney (AU); John Brown, Mosman (AU); Michael Squires, Ryde (AU); Fred Marcaly, Amherst, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days. days.

(21) Appl. No.: 14/407,350

(22) PCT Filed: Jun. 10, 2013

(86) PCT No.: PCT/US2013/044942
§ 371 (c)(1),
(2) Date: Dec. 11, 2014

(87) PCT Pub. No.: WO2013/188276
PCT Pub. Date: Dec. 19, 2013

(65) Prior Publication Data
US 2015/0138763 A1    May 21, 2015

Related U.S. Application Data

(60) Provisional application No. 61/734,871, filed on Dec. 7, 2012, provisional application No. 61/658,094, filed on Jun. 11, 2012.

(51) Int. Cl.
*F21V 13/04* (2006.01)
*F21L 4/00* (2006.01)
(Continued)

(52) U.S. Cl.
CPC ............ *F21V 13/045* (2013.01); *F21L 4/005* (2013.01); *F21L 4/027* (2013.01); *F21L 4/045* (2013.01);
(Continued)

(58) Field of Classification Search
CPC .... G02B 6/0018; G02B 6/003; G02B 6/0063; F21V 5/006; F21V 7/0075; F21V 13/045;
(Continued)

(56) References Cited

U.S. PATENT DOCUMENTS 5,339,225 A    8/1994   Wiggerman
5,584,556 A *  12/1996  Yokoyama ........... G02B 6/0036
                                                      349/62
(Continued)

FOREIGN PATENT DOCUMENTS

DE         1112202 B      8/1961
DE         29614836 U1    1/1997
(Continued)

OTHER PUBLICATIONS

International Searching Authority, International Search Report and Written Opinion for International Application No. PCT/US2013/044942, dated Feb. 6, 2014, 16 pages, European Patent Office, Netherlands.

*Primary Examiner* — Alexander Garlen
*Assistant Examiner* — Colin Cattanach
(74) *Attorney, Agent, or Firm* — Alston & Bird LLP

(57) ABSTRACT

A portable lighting device adapted to provide an area light, said device including a body having a battery housing to hold batteries to power said device. The device includes a light panel functioning as a lens to act as an area light emitter, characterized in the said light panel is slidable into and out of said body, said light panel being constructed of a substantially flat panel portion.

10 Claims, 12 Drawing Sheets

(51) Int. Cl.

| | | |
|---|---|---|
| *F21V 21/40* | (2006.01) | |
| *F21V 31/00* | (2006.01) | |
| *F21L 4/04* | (2006.01) | |
| *F21V 5/00* | (2018.01) | |
| *F21V 14/08* | (2006.01) | |
| *F21V 21/22* | (2006.01) | |
| *F21L 4/02* | (2006.01) | |
| *F21L 4/08* | (2006.01) | |
| *F21V 8/00* | (2006.01) | |
| *F21Y 115/10* | (2016.01) | |

(52) U.S. Cl.
CPC ............ *F21V 5/006* (2013.01); *F21V 14/085* (2013.01); *F21V 21/22* (2013.01); *F21V 21/406* (2013.01); *F21V 31/005* (2013.01); *G02B 6/0018* (2013.01); *F21L 4/022* (2013.01); *F21L 4/085* (2013.01); *F21Y 2115/10* (2016.08); *G02B 6/0013* (2013.01); *G02B 6/0015* (2013.01)

(58) Field of Classification Search
CPC .... F21V 14/025; F21V 14/045; F21V 14/065; F21V 14/085; F21V 21/145; F21L 4/022; F21L 4/045; F21L 4/085
See application file for complete search history.

(56) References Cited

U.S. PATENT DOCUMENTS

| | | | | |
|---|---|---|---|---|
| 5,613,751 A * | 3/1997 | Parker | ................. | G02B 6/0018 362/23.16 |
| 5,642,933 A | 7/1997 | Hitora | | |
| 5,708,749 A | 1/1998 | Kacheria | | |
| 5,743,634 A | 4/1998 | Sitzema et al. | | |
| 5,758,949 A | 6/1998 | Van Deursen | | |
| 5,808,708 A * | 9/1998 | Oyama | ................ | G02B 6/0018 349/62 |
| 6,024,463 A | 2/2000 | Ishikawa et al. | | |
| 6,027,221 A | 2/2000 | Ishikawa et al. | | |
| 6,167,182 A * | 12/2000 | Shinohara | ............ | G02B 6/0036 385/129 |
| 6,186,645 B1 | 2/2001 | Camarota | | |
| 6,205,691 B1 | 3/2001 | Urda et al. | | |
| 6,259,854 B1 | 7/2001 | Shinji et al. | | |
| D448,873 S | 10/2001 | Dalton et al. | | |
| 6,337,946 B1 | 1/2002 | McGaffigan | | |
| 6,469,833 B2 | 10/2002 | Eguchi | | |
| 6,520,655 B2 | 2/2003 | Ohuchi | | |
| 6,655,809 B2 * | 12/2003 | Suzuki | .............. | G02F 1/133615 362/23.15 |
| 6,808,281 B2 | 10/2004 | Ho | | |
| 6,966,685 B2 | 11/2005 | Li et al. | | |
| 7,011,442 B2 | 3/2006 | Okuwaki et al. | | |
| 7,223,005 B2 | 5/2007 | Lamb et al. | | |
| 7,497,611 B2 | 3/2009 | Chen et al. | | |
| 7,604,388 B2 | 10/2009 | Nishio et al. | | |
| 7,784,975 B2 | 8/2010 | Krebs et al. | | |
| 8,317,366 B2 | 11/2012 | Dalton et al. | | |
| 8,337,034 B2 * | 12/2012 | Ronda | ..................... | F21S 6/003 359/803 |
| 8,587,746 B2 * | 11/2013 | Kim | ..................... | G02B 6/0088 349/61 |
| 8,845,170 B2 * | 9/2014 | Kim | ....................... | G02B 6/003 362/608 |
| 9,261,688 B2 * | 2/2016 | Takeda | ................. | G02B 17/086 |
| 2001/0017773 A1 * | 8/2001 | Suzuki | ............. | G02F 1/133615 362/23.15 |
| 2001/0048603 A1 | 12/2001 | Ohuchi | | |
| 2002/0057562 A1 * | 5/2002 | Sasako | ................ | G02B 6/0053 362/610 |
| 2004/0085762 A1 | 5/2004 | Iwasa et al. | | |
| 2004/0095743 A1 * | 5/2004 | Yu | ........................ | G02B 6/0061 362/613 |
| 2004/0105157 A1 | 6/2004 | Matsushita et al. | | |
| 2004/0125590 A1 * | 7/2004 | Tsai | .................... | G02B 6/0038 362/625 |
| 2004/0130911 A1 | 7/2004 | Chen | | |
| 2004/0141104 A1 * | 7/2004 | Yu | ........................ | G02B 6/003 349/65 |
| 2004/0145914 A1 * | 7/2004 | Yu | ........................ | G02B 6/0016 362/558 |
| 2005/0068767 A1 | 3/2005 | Uke et al. | | |
| 2007/0040959 A1 * | 2/2007 | Liao | ..................... | G02B 6/0043 349/62 |
| 2007/0285946 A1 * | 12/2007 | Lin | ........................ | G02B 6/0036 362/615 |
| 2008/0151572 A1 * | 6/2008 | Ma | ........................ | G02B 6/0018 362/609 |
| 2008/0174720 A1 * | 7/2008 | Fang | ..................... | G02B 6/0085 349/65 |
| 2008/0260328 A1 * | 10/2008 | Epstein | ................ | G02B 6/0018 385/32 |
| 2009/0201698 A1 * | 8/2009 | Klick | ................... | G02B 6/0018 362/555 |
| 2009/0231846 A1 * | 9/2009 | Nakajima | ............... | G02B 6/003 362/237 |
| 2009/0310350 A1 | 12/2009 | Dalton et al. | | |
| 2009/0316077 A1 * | 12/2009 | Li | ........................ | G02B 6/0076 349/65 |
| 2010/0128198 A1 * | 5/2010 | Kim | ..................... | G02B 6/0088 349/61 |
| 2010/0296264 A1 * | 11/2010 | Ronda | ..................... | F21S 6/003 362/84 |
| 2011/0211340 A1 | 9/2011 | Smith | | |
| 2011/0255303 A1 * | 10/2011 | Nichol | .................... | G02B 6/006 362/606 |
| 2012/0008309 A1 | 1/2012 | Hale | | |
| 2012/0057362 A1 * | 3/2012 | Fritz | ..................... | B60Q 1/2665 362/494 |
| 2012/0268966 A1 * | 10/2012 | McCollum | ................ | F21S 8/06 362/607 |
| 2013/0044517 A1 * | 2/2013 | Pinon | ..................... | F21V 19/001 362/640 |
| 2015/0138763 A1 | 5/2015 | Bennett et al. | | |
| 2015/0167943 A1 | 6/2015 | Rugendyke et al. | | |
| 2016/0116744 A1 * | 4/2016 | Takeda | ................. | G02B 27/0172 385/33 |

FOREIGN PATENT DOCUMENTS

| | | |
|---|---|---|
| DE | 10320485 A1 | 12/2004 |
| EP | 1180640 A1 | 2/2002 |
| FR | 2796126 A3 | 1/2001 |
| JP | 4-108806 U | 9/1992 |
| JP | 2004-176425 A | 6/2004 |
| WO | WO 2000/045086 A1 | 8/2000 |
| WO | WO 2001/001039 A1 | 1/2001 |
| WO | WO 2002/081966 A1 | 10/2002 |
| WO | WO 2005/040676 A1 | 5/2005 |

* cited by examiner

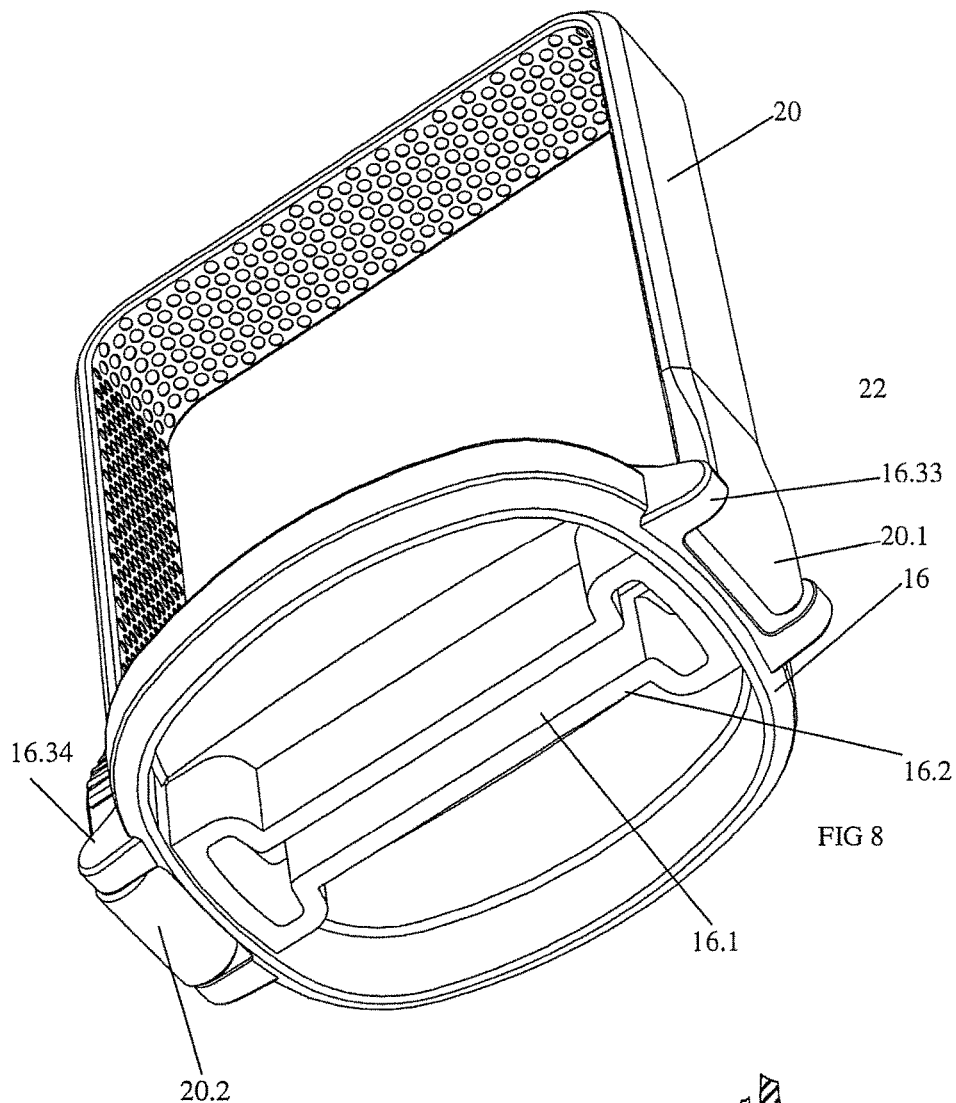
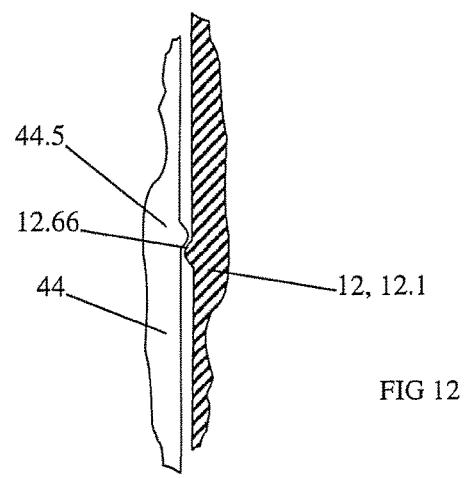

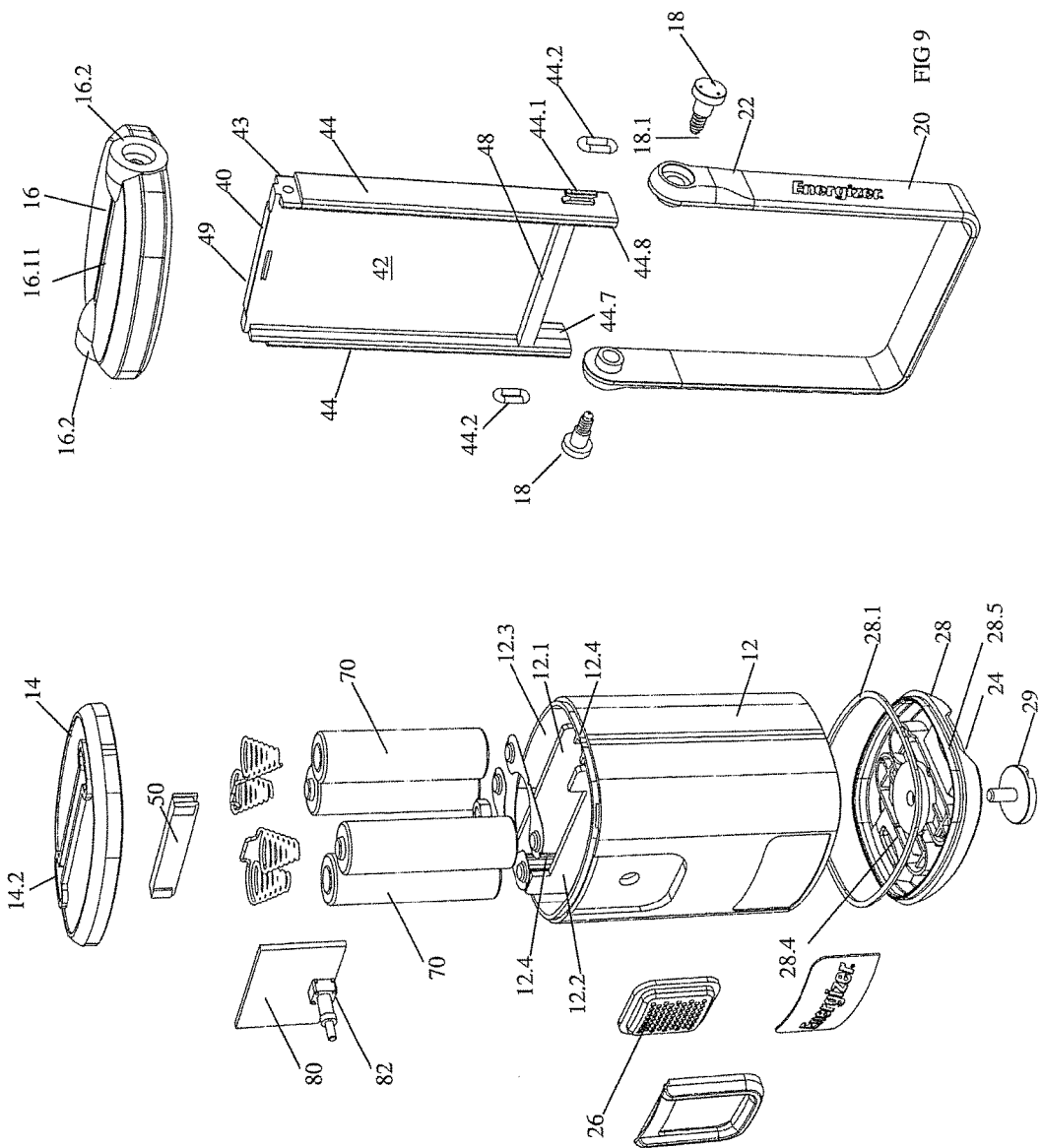

LIGHTING DEVICE CONSTRUCTION

FIELD OF THE INVENTION

The present invention relates to lighting devices such as lanterns and the like, which are able to be deployed from a transport mode to a use mode and vice versa.

BACKGROUND OF THE INVENTION

Lantern lighting devices have been known for some time and there is market need for improved lantern devices that work more effectively and efficiently and which satisfy current market needs.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a portable lighting device adapted to provide an area light, the device including a body having a battery housing to hold batteries to power the device, the device including a light panel functioning as a lens to act as an area light emitter, characterized in that the light panel is slidable into and out of the body, the light panel being constructed of a substantially flat panel portion.

The light panel can include a reflective surface thereon to receive light from a light source mounted in the body.

The light source can be an LED light source.

The reflective surface can be an internal surface formed by an angled formation on the light panel.

The surface can be able to move with the light panel so as to be aligned with the light source when the light panel is moved to an extended condition.

A travel limiter can be provided to interact with the light panel and the body to prevent the light panel moving past a predetermined position with respect to the body.

The predetermined position can be where the light source is aligned with the surface.

The surface can reflect light to the rest of the panel.

The panel includes portions having etched formations thereon.

The panel can have a generally I or H shaped cross-section.

A cap can be located at a distal end of the light panel.

The cap can include a window means therein whereby light entering into the panel from the body is visible through the cap.

Extending the light panel to its fullest extent can switch a switch to power the light source.

The cap can include a handle mechanism attached thereto.

The handle mechanism can include at least one elastically deformable portion.

The handle mechanism can rotate relative to the body.

The handle mechanism can be positioned and extended around the body so as to clamp the cap to the body to prevent unwanted movement of the cap and the light panel with respect to the body.

Between the light source and the light panel there can be located a collimator lens to receive light from the light source and to transmit collimated or nearly collimated light to the light panel.

The light panel, by means of a front and rear generally planar surfaces and exterior edge surfaces of on flange formations can provide a radiation of light in a 360 degree fashion when the lighting device is switched on and the light panel and light source are aligned.

One aspect of the invention relates to a portable lighting device adapted to provide an area light, said device includes: a power source; a light source electrically coupled to the power source; a light panel optically coupled to the light source; a body having a first portion and a second portion, wherein the first portion is configured to facilitate guiding the light panel from a transport mode to a use mode, and the second portion is configured to secure the power source and the light source in the body; and the first portion is isolated from the second portion, such that water that enters the first portion is unable to enter the second portion.

Another aspect of the invention relates to the first portion including one or more apertures formed at or near a bottom portion of the body, such that water that enters first portion of the body flows out of the portable device through the one or more apertures.

Another aspect of the invention relates to the light source being permanently secured to the base and the light panel is configured to be housed in the body during the transport mode and the light panel extends from the body in the use mode.

Another aspect of the invention relates to the light source being at least one light emitting diode.

Another aspect of the invention relates to the power source being at least one from a group consisting of a primary battery and a secondary battery.

On aspect of the invention relates to a lighting panel for a portable lighting device, the lighting panel including: a substrate having a pair of generally planar surfaces configured to output light received from an associated light source, wherein the substrate includes a curved input edge for receiving light from the associated light source and a curved reflective surface for reflecting the received light to the planar surfaces.

Another aspect of the invention relates to the curved input surface including a central portion that is substantially parallel to the pair of planar surfaces.

Another aspect of the invention relates to the curved input surface being configured to receive collimated light.

BRIEF DESCRIPTION OF THE DRAWINGS

FIG. 8 illustrates an underneath view of a cap and handle of the lighting device of FIG. 1;

FIG. 9 illustrates an exploded perspective view of the components of the lighting device of FIG. 1;

FIG. 12 illustrates a "push past" detent between the light panel and the light panel housing or device body.

DETAILED DESCRIPTION OF THE INVENTION

Figure 1:
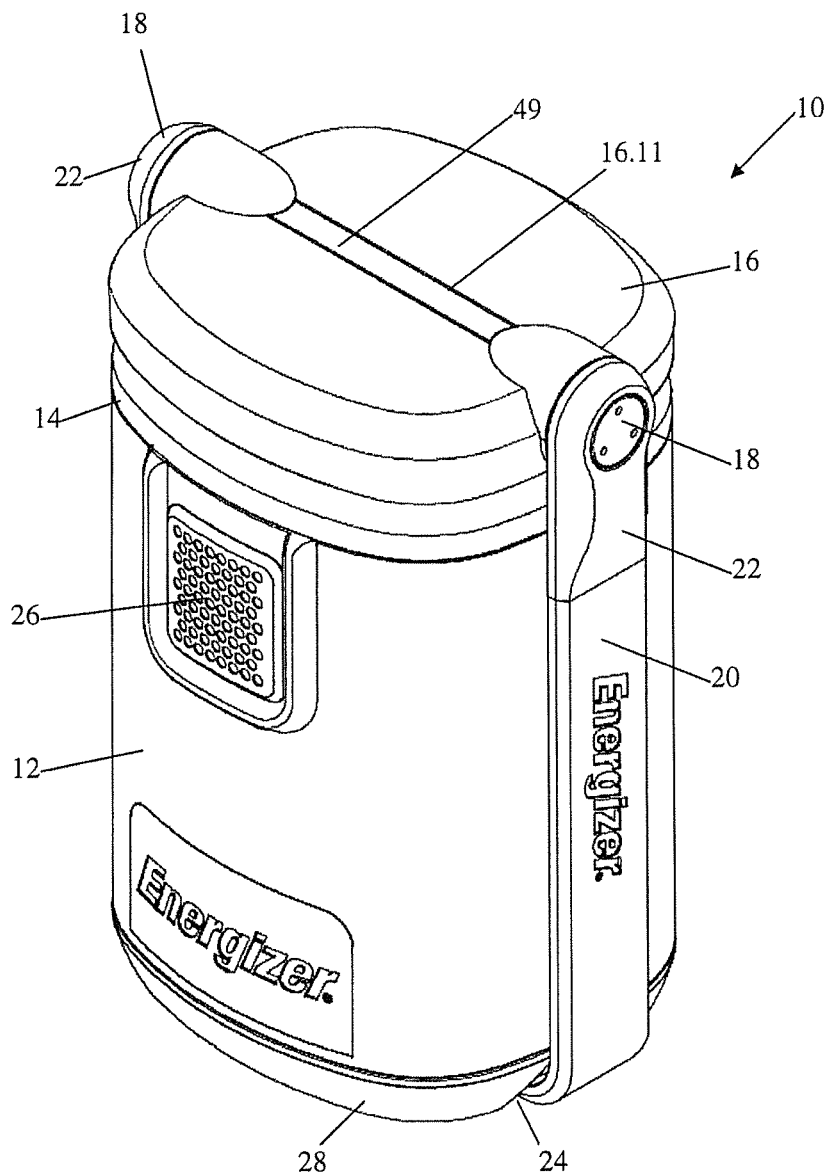
FIG. 1 illustrates a perspective view of a lighting device in a transport mode.
Figure 2:
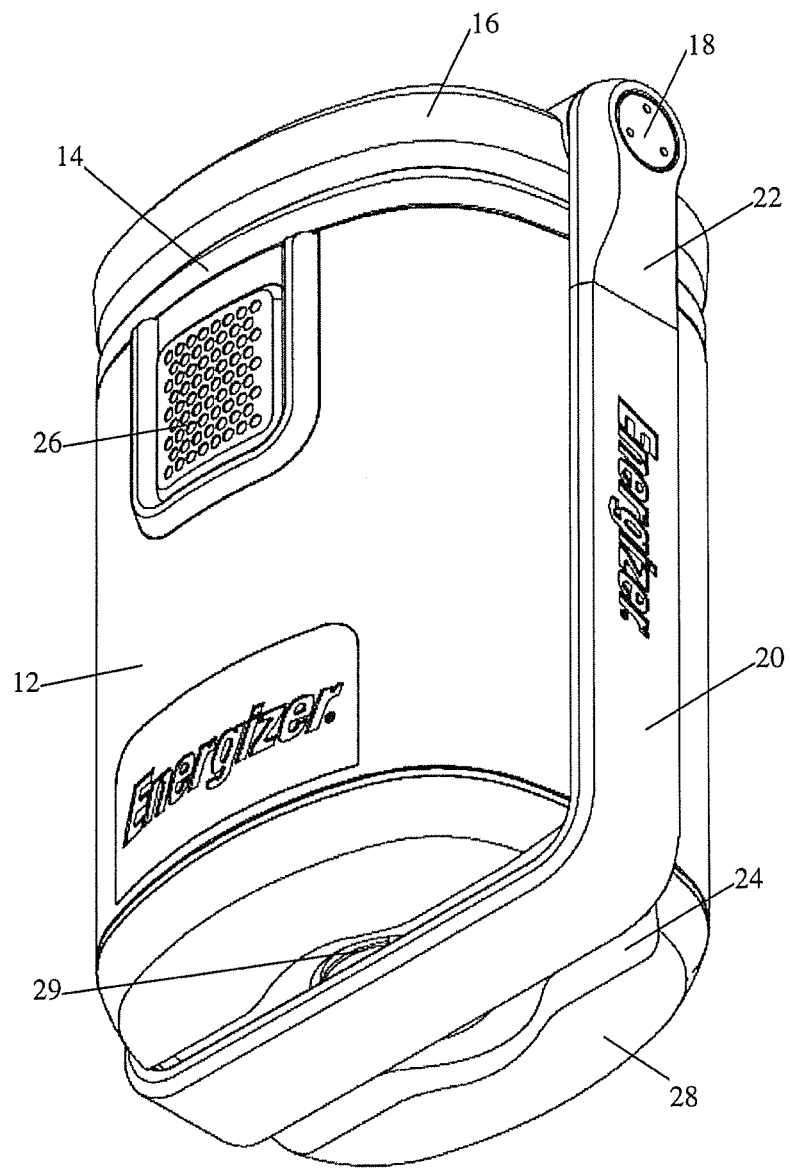
FIG. 2 illustrates an underneath perspective of the lighting device of FIG. 1.

Illustrated in FIGS. 1 and 2 is a lighting device 10 that is configured to provide light in an area light fashion. The lighting device 10 has a body 12 configured to provide a housing for batteries to power the lighting device 10. As is discussed in more detail below, the body 12 also includes a light panel housing configured to house a light panel in a transport (or storage) mode and the light panel is configured to extend out of the body 12 in a use mode.

The lighting device 10 is illustrated in FIGS. 1 and 2 in its retracted or transport mode. The lighting device 10 has a light panel cap 16, a body cap 14 and a handle comprising handle pivots 22, and an elastomeric strap 20 that extends from the pivot 22 on one side to the pivot 22 on the other side. The pivots 22 may be secured to the light panel cap 16 by use of one or more screws through the pivots 18 or any other suitable manner.

Access to the battery housing is obtained via a base cap 28, which is secured to the body 12 by a user accessible screw 29. The screw 29, as is visible in FIG. 2, is overlaid or covered by the strap 20 when in the travel or collapsed condition so as to prevent access to the screw 29. It is noted from FIG. 2 that the base cap 28 includes a side to side extending groove 24 in its under surface, in which the elastomeric handle 20 can sit. The elastomeric handle 20 when in the arrangement as illustrated in FIG. 2 serves to maintain the lighting panel cap 16 in contact with the body cap 14 and relative movement between these is prevented by means of the elastomeric handle 20 extending from the light panel cap 16 under the body 12 through the channel 24 to thereby prevent such motion. In this embodiment, the handle may be pivoted and is permanently held at both ends.

Figure 3:
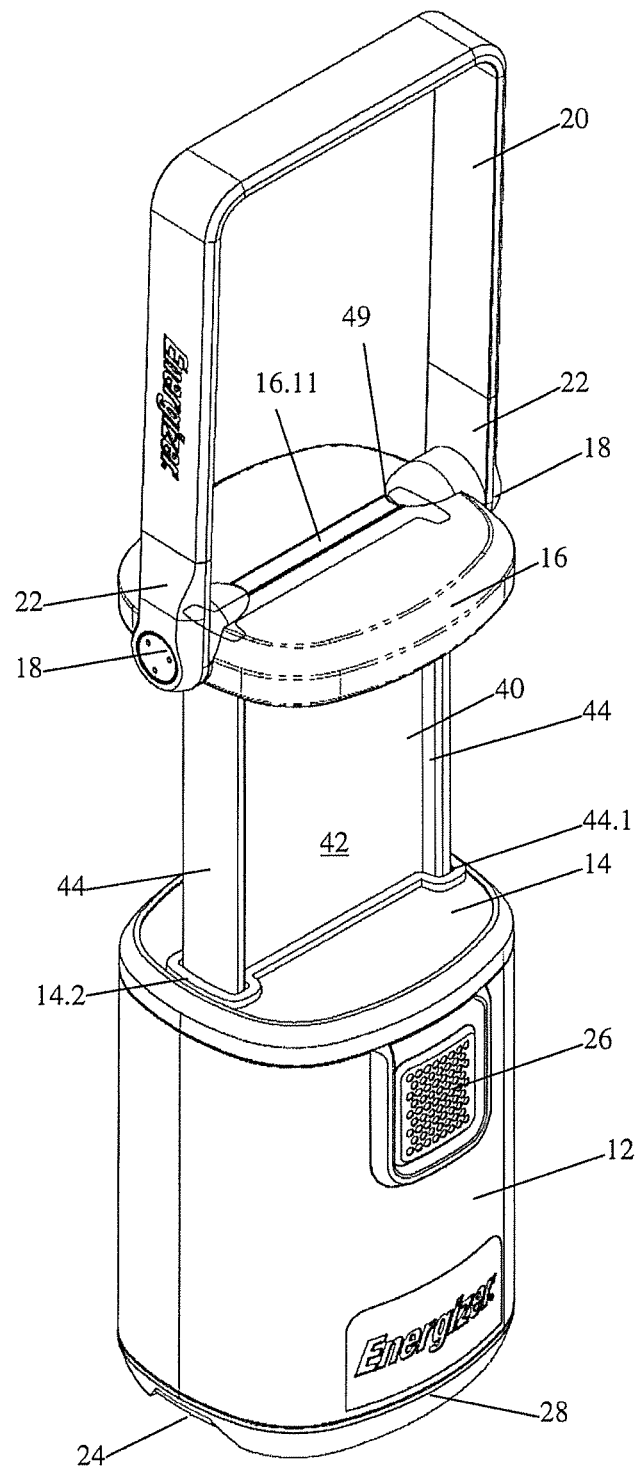
FIG. 3 illustrates a perspective view of the light device of FIG. 1 in its extended/use mode as an area light.
Figure 4:
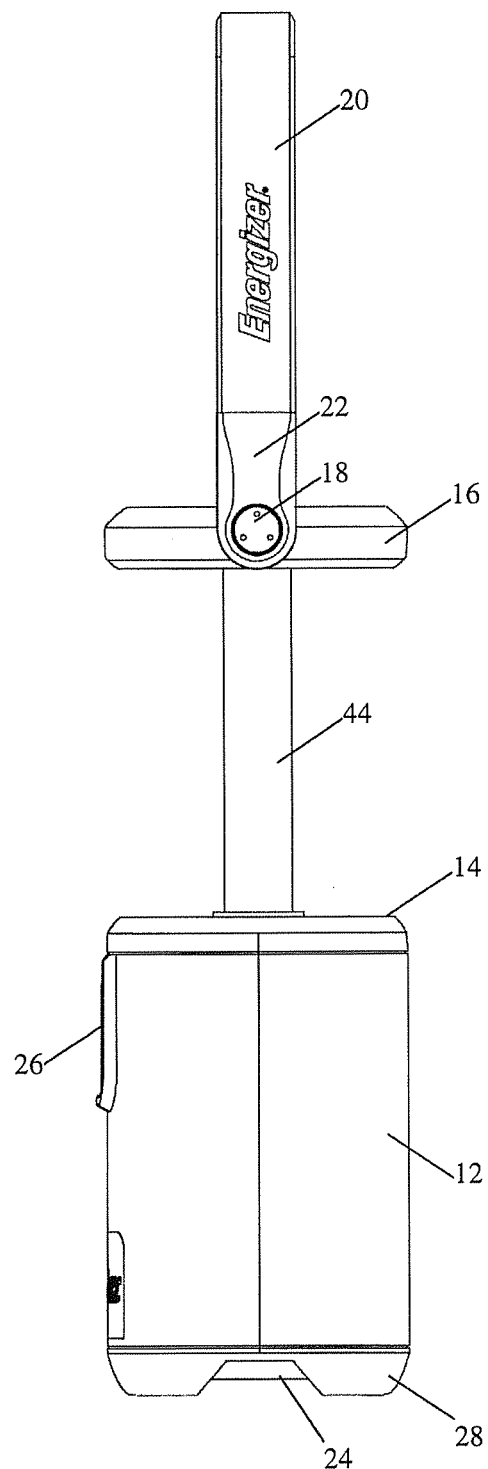
FIG. 4 illustrates a side view of the lighting device of FIG. 3.

The lighting device 10 is in the nature of a lantern that is deployed in the manner illustrated in FIGS. 3 and 4. It will be seen from FIGS. 3 and 4 that once the handle 20 has been removed from the groove 24 and rotated to an upper location; the light panel cap 16 is then able to move with respect to the body cap 14. The movement from the transport mode to the use mode is a generally vertical movement, which is guided and controlled by light panel 40. Alternatively, light panel may be configured to move in a generally non-vertical movement. Light panel 40 also acts as a lens, passing out of the light panel housing 12.1, through a shaped aperture 14.2 in the cap 14. A friction generating mechanism can be provided between the lighting panel 40 and the body 12 so that when the light panel 40 has been extended to its furthest distance of travel with respect to the body 12 it will remain in this arrangement until pushed down towards the body with sufficient force to overcome the friction generation mechanism. Alternatively a "push past" detent can be provided, such as that illustrated in FIG. 12, so that once a rib 44.5 on the flange 44 of light panel 40 passes over a rib 12.66 on light housing 12.1 or the body 12, the light panel 40 will not move into the body 12 under gravity. The friction generation mechanism, and the "push past" detent, which will be described in detail below, can also provide a travel limiting formation relative to the body 12 and its cap 14 so that the optical components of the lighting device 10 will be appropriately aligned so that the optical components can correctly function in the lantern mode of the device 10.

As is best seen in FIG. 8, in one embodiment, the underside of the cap 16 includes a shaped recess 16.1 surrounded by a surrounding wall 16.2 which matches the shape of the lighting panel 40. As is best seen in FIG. 1, it can be seen that the cap 16 includes an aperture rim 16.11 through which a face and edge 49 of the lighting panel 40 protrudes so that its upper edge is flush with the cap 16. The functionality of this will be described in greater detail later. A person of ordinary skill in the art will appreciate that the shaped recess illustrated in FIG. 8 is illustrative in nature and not intended to limit the scope of the present invention. Any desirable shape may be used in accordance with aspects of the present invention.

Figure 5:
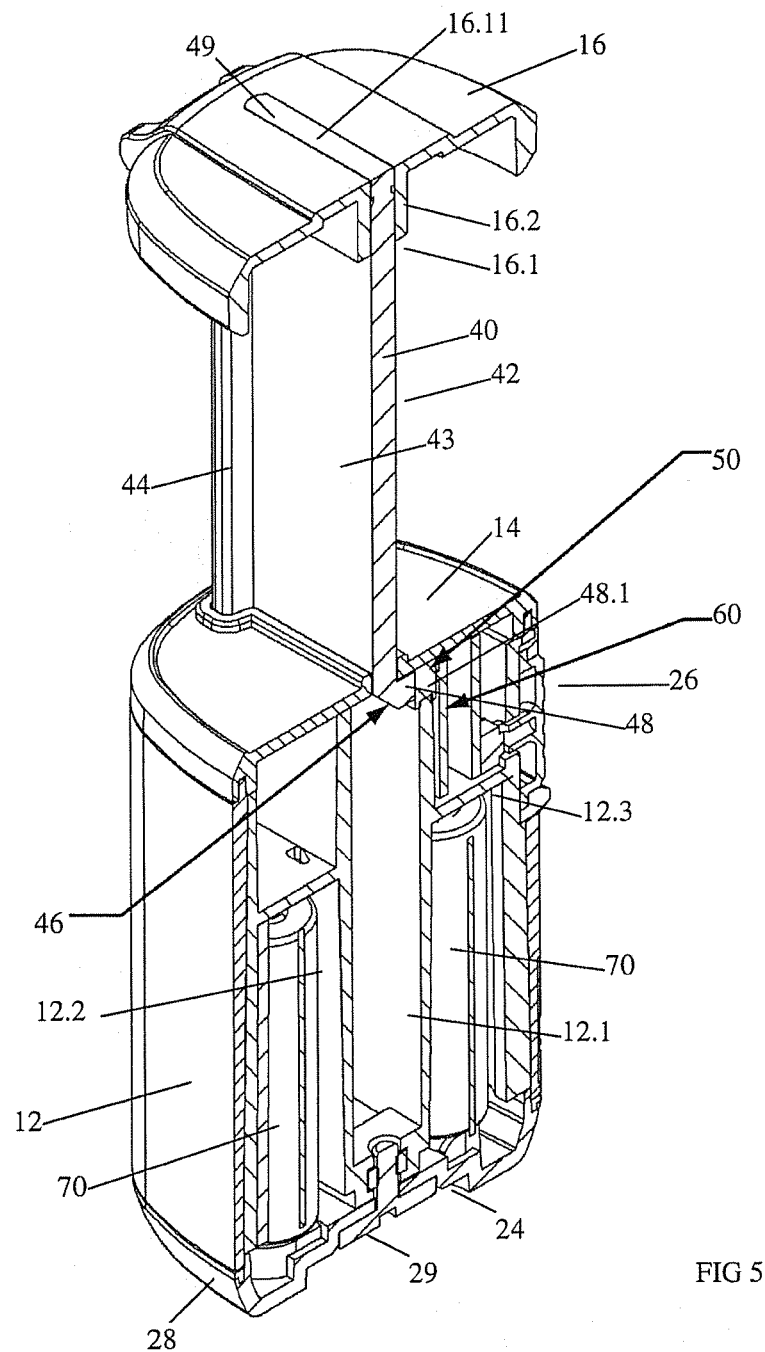
FIG. 5 illustrates a cross section through the lighting device of FIG. 4.

Referring to FIG. 3, the light panel 40 comprises a main planar surface 42 and a pair of side flanges having surfaces 44, which provides lighting panel 40 with a cross-section, which is similar to that of an I-beam or an H-beam. Referring to FIG. 5, the light panel housing 12.1 is isolated from the battery housings and switching and LED housings, thus any water entering through the aperture 14.2 will simply pass through the body 12, the lighting panel housing 12.1 and exit through apertures 28.4 and 28.5 in the base of base cap 28. Thus, a sliding seal between the aperture 14.2 and the light panel 40 is not required as only water resistance is provided. The apertures 28.4 and 28.5 will receive water that enters the lighting panel housing 12.1, and that water will in normal circumstances flow out therefrom. If the passage were to be blocked, the water that gathers in the apertures 28.4 and 28.5, will be pushed out of the body 12, when the light panel 40 is retracted fully, which will cause the flange extensions 44.7 and 44.8 to respectively enter the apertures 28.4 and 28.5, effectively acting like a piston. Further these apertures capture the flange extensions 44.7 and 44.8 preventing any lateral movement in the transport mode. If it is required to provide the lantern 10 with some level of water proofing of the movement of the lighting panel 40 with respect to the cap 14 and its aperture 14.2, a sliding seal between the cap 14 and the lighting panel 40 can be provided.

Figure 6:
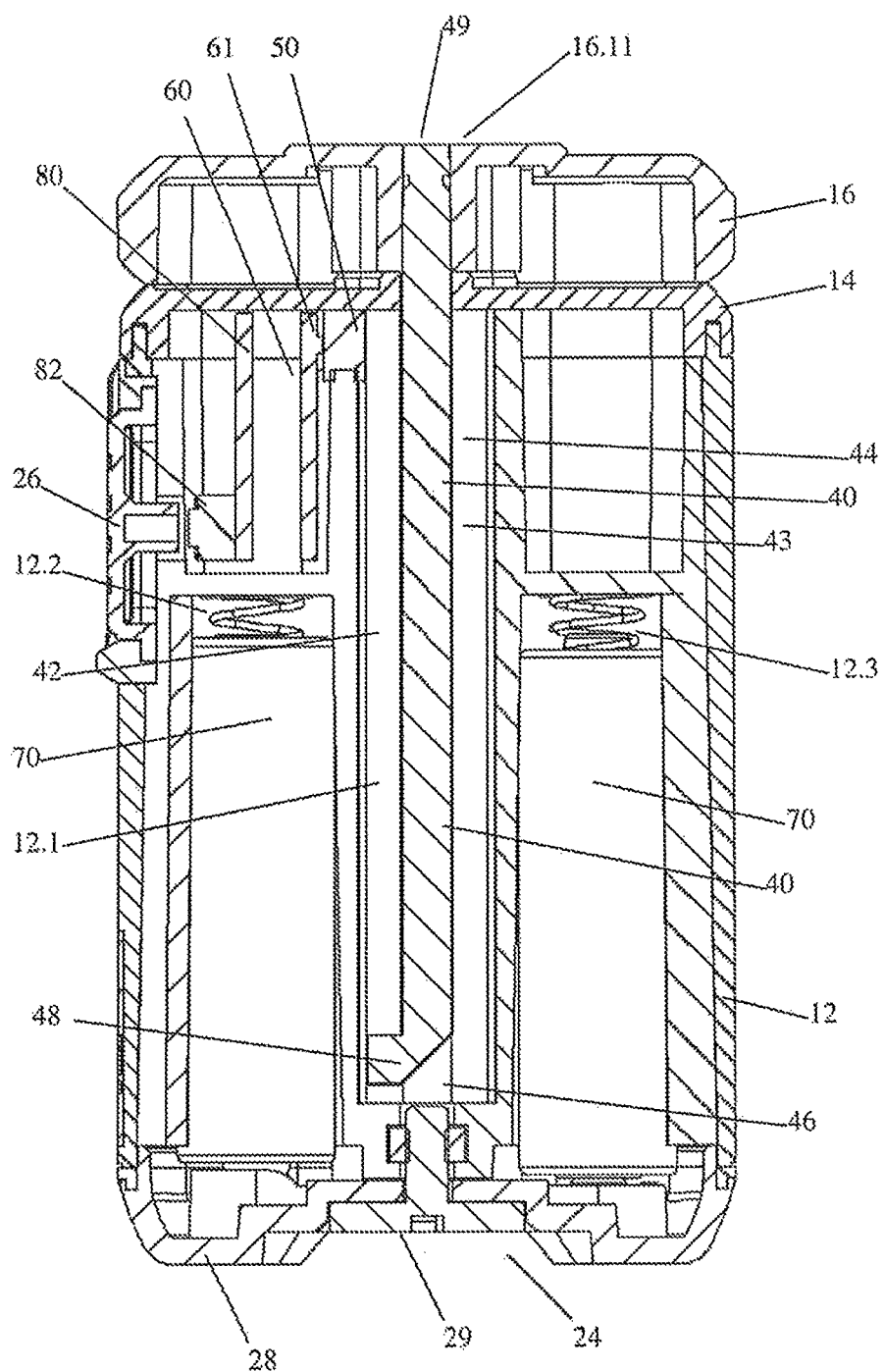
FIG. 6 illustrates a cross section through the lighting device of FIG. 1 with handle removed.
Figure 7:
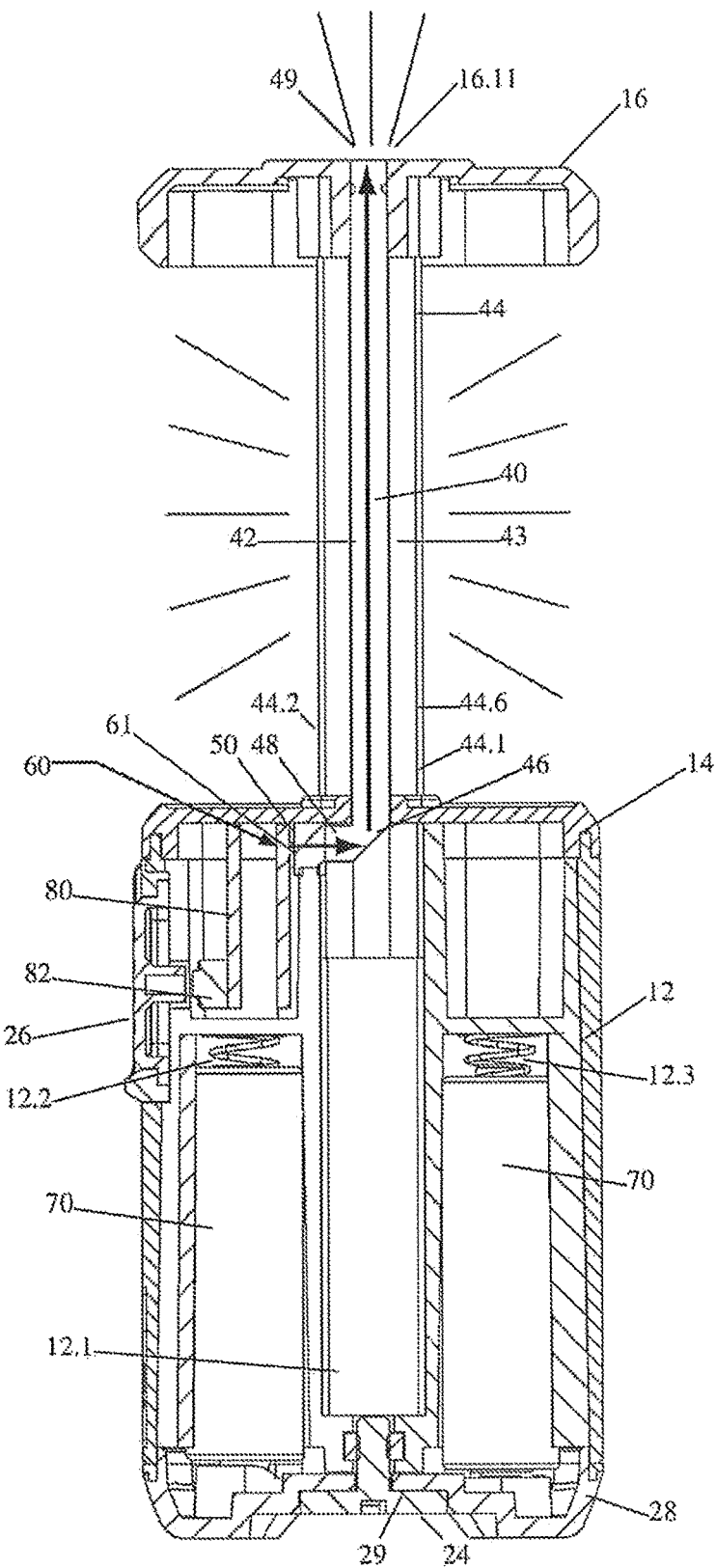
FIG. 7 illustrates a cross section through the lighting device of FIG. 4 with the handle removed.
Figure 7B:
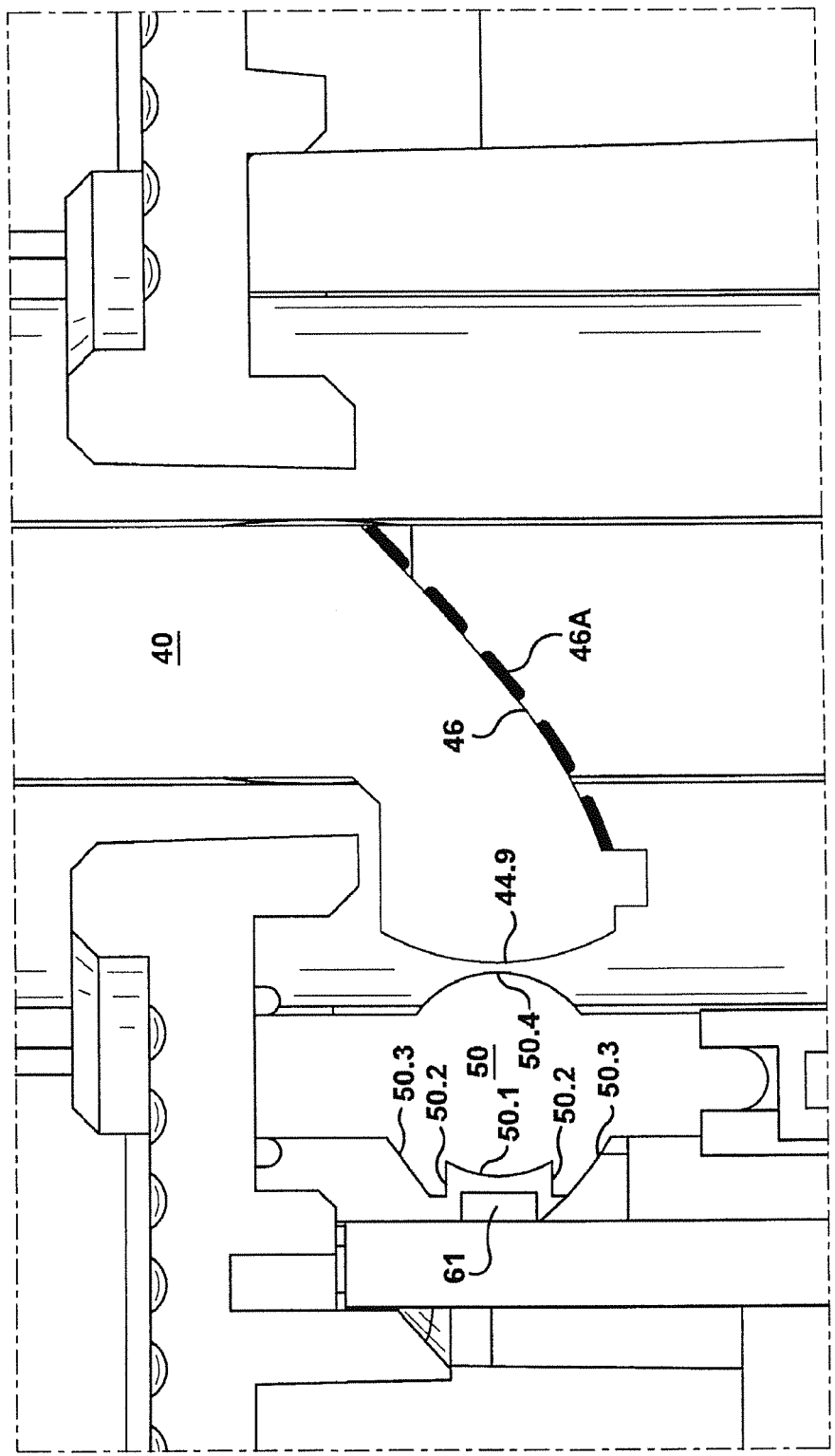
FIG. 7B illustrates another exemplary cross section in accordance with aspects of the present invention.

Referring to FIGS. 5, 6, 7 and 7B, lighting panel 40 has at its lower end a "periscope" arrangement which is integrally formed at the base of the lighting panel 40. The periscope arrangement provides the ability in the device 10 to keep the electronics and circuit board holding the LEDs at an upper level in the body 12, which allows light to be emitted from an upper location in the use mode. The periscope arrangement comprises a generally 45 degree surface 46 and a generally horizontal or lateral extension or lateral portion 48, which feeds light received on its end surface 48.1 to the internally reflective surface 46 on the inside of the lighting panel 40. Alternatively, surface 46 can be shaped with curvature so as to optimize the ability to reflect light received from its end surface 48.1 (the input edge of the light panel) and direct the light into lighting panel 40, as illustrated in FIG. 7B. This arrangement ensures that any light that enters via the surface 48.1 is directed up to the upper reaches of the lighting panel 40, so that light will be radiated out from the surfaces 42 as well as from the surfaces of the lateral portions 44. Light may also be emitted from the upper surface 49 of the lighting panel 40, which passes through the cap 16.

Another embodiment is illustrated in FIG. 7B. Referring to FIG. 7B, the provision of the 45 degree or curved surface 46 on the outside of the lighting panel 40 creates an internally reflective surface in the media (e.g., acrylic, polycarbonate, etc.) of the lighting panel 40 which is totally internally reflective and allows for total internal reflection of the light which will enter the lighting panel 40 via the surface 48.1 of the lateral portion 48. In one embodiment, a reflective layer 46A may be applied to the reflective surface 46 in order to more efficiently reflect light incident the surface 46, as illustrated in FIG. 7B. The reflective layer may be a reflective tape and/or reflective coating, etc. Note, the reflective layer 46A in FIG. 7B is illustrated in a dashed line. The reflective layer 46A may be continuous and/or discontinuous. The reflective layer 46A is illustrated in a dashed line for purposes of clarity and to make clear that the reflective layer is optional and may not be needed to carry out aspects of the present invention.

Light is emitted from a light source 61, and collected by a collimator lens 50 (e.g., a total internal reflection (TIR) lens) having input surfaces 50.1 and 50.2. The input surface 50.1 of the collimator lens 50 may be straight or curved as illustrated in FIG. 7B. Preferably, the input surface 50.1 is configured to focus light received by the light source 61 to the surface 50.4. The Lateral input surfaces 50.2 direct light incident upon them to the reflective or totally internally reflective surfaces 50.3. Light reflected from the reflective surfaces 50.3 is then generally focused toward surface 50.4. Preferably, the configuration of the collimator lens 50 is to transfer light emitted from light source 61 and focuses the light toward surface 50.4. The light from reflectors 50.3 and input surface 50.1 is further collimated or nearly collimated by surface 50.4 and directed into the periscoping lens 40 and enters at the surface 44.9 (referred to surface 46 in other embodiments). The incident surface of the periscoping lens 44.9 is also shaped so as to provide further directional control of the light as it enters the periscoping lens and directs the light so it can be reflected by surface 46 into the rest of the lens 40.

Referring to FIG. 7B, the lighting panel 40 includes a substrate having a pair of generally planar surfaces 42, 43 (discussed below) configured to output light received from an associated light source 61. The panel includes a curved input edge 44.9 for receiving light from the associated light source and a curved reflective surface 46 and/or 46A for reflecting the received light to the planar surfaces. At or near the center of the curved input edge may include a central portion having a tangent that is substantially parallel to the pair of planar surfaces. The curved input surface 44.9 is configured to receive collimated light from the lens 50.

Figure 11:
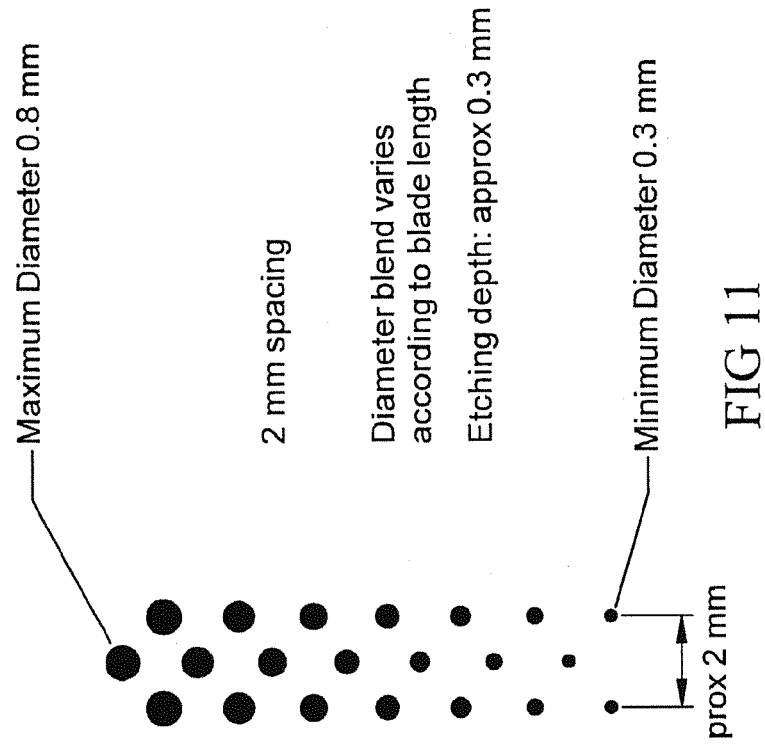
FIG. 11 illustrates a schematic of an exemplary etch pattern.
Figure 10:
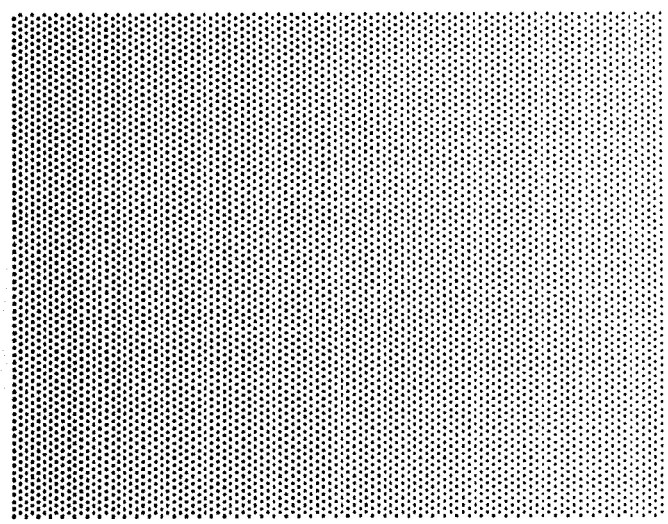
FIG. 10 illustrates a plan view of an arrangement of etched formations for application to the planar surfaces of the light panel.

The front surface 42 and rear surface 43 include a series of optical elements (e.g., etched formations) preferably in an array and the formations are generally shaped in a cylindrical or circular fashion. Exemplary optical elements formed by laser etching are illustrated in FIGS. 10 and 11, and as can be seen from these figures these formations are spaced at closer distances to each other in a direction away from the light source. This provides a graduated effect from top to bottom as illustrated in FIG. 10, whereby the upper portions are more dense with etched surface than the lower portions. That is, the closer the optical elements are to the light source, the optical elements are smaller and less dense than optical elements farther away from the light source. This provides a graduated effect from top to bottom as illustrated in FIG. 10, whereby the upper portions are more dense with optical elements than the lower portions. A person of ordinary skill in the art will readily appreciate that methods other than laser etching may be used to form the optical elements and, unless otherwise claimed, aspects of the present invention are not limited to laser etching.

It will be noted that the flanges 44 extend at 44.7 and 44.8 past the lateral portion 48. This is provided so as to enable a length of the flanges 44 to remain in the channel 12.4, when the light panel 40 is lifted to its maximum distance out of the body 12. This helps provide the light panel 40 and body 12 assembly with stability and lateral support to resist bending moments which may be applied to the base of the lighting panel by lateral forces which may occur during use.

While the arrangements of FIGS. 5 to 7 illustrate the cross-sections of the assembly of the components of FIG. 13, the construction of the device 10 of FIG. 9 functions in the same manner, as will be described in more detail below.

FIG. 11 is a diagram showing an exemplary arrangement and etching details to produce the etching formations on the light panel, as illustrated in FIG. 10. The schematic illustration has the smallest cylinders of a minimum diameter of 0.3 mm being formed on the light panel 40 planar surface 42, or 42 and 43, at a location where the surfaces 42 and 43 are exposed and closest to the LEDs. As illustrated in FIG. 6, the whole surface is covered, however as the blade extends away from the light source a 2 mm row spacing is observed, and the cylinders are gradually increased in diameter up to the maximum diameter of 0.8 mm. Depending upon the length of the light panel 40, which will mean some adjacent rows may have the same diameter such that all of the individual cylinders in at least two adjacent rows may have identical diameters or depths as shown in FIG. 11.

The etchings are referred to as cylinders, because each circle will be laser etched to a depth of approximately 0.3 mm. However, the cylinders can be further varied in depth to produce desired particular effects. It will be also noted from FIG. 11 that the columns of etched cylinders are offset by a half row spacing, and that the third column of cylinders lies 2 mm away from the first column on the left, with the second column being the one offset by a half row spacing. This array is arranged to cover the whole planar surface 42 and 43 or if desired particular effects can be produced by providing etched cylinders at different intervals or spacing. A person of ordinary skill in the art will readily appreciate that the precise pattern, spacing and/or depth of the etching may be varied to provide a particular result.

Referring to FIG. 6, the body 12 has two battery housings or compartments 12.2 and 12.3, which may be positioned on either side of the lighting panel housing 12.1. The lighting panel housing is sealed or rain resistant, relative to the other housings including the battery housings 12.2 and 12.3. The switch housing and PCB housing are located above the battery housing 12.2 and are also sealed with respect to the light panel housing 12.1, by means of the collimator lens 50, which allows the light to pass from the LEDs 61 to the lateral portion 48. Thus any condensation or water that may pass into the light panel housing 12.1 will not gain access to the electric components of the lighting device 10, while light can still exit the PCB housing.

In order to separate the PCB and switch housing from the light panel housing 12.1 the collimator lens 50 is provided that has this dual function. The collimator lens 50 not only seals the housing containing the battery and PCB 60, switch PCB 80 and switch 82 from the light panel housing 12.1, but it also focuses or collimates light that is emitted from the LEDs 61 on the printed circuit board 60 so that the light passing through the collimating lens 50 will be in its most optimal condition for entry into the surface 48.1 of the lateral portion 48 on the light panel 40.

The lateral portion 48 as best illustrated in FIG. 7 of the light panel 40 can also serve a second function by its interaction with the under surface of the cap 14 to limit the travel of the light panel 40 and light panel cap 16 relative to the body 12 and the cap 14. Further, by preventing travel past this point it also serves the function of aligning the collimating lens 50 with the entry surface 48.1 of lateral portion 48 of the light panel 40 thereby allowing light in its optimal condition to enter into the base of the light panel 40 for transmission up and along and out from the light panel 40. If desired a switch mechanism may be provided to interact with the movement limiting formations so as to switch said light on or off when that limited condition is achieved.

By the I-shaped or H-shaped lighting panel 40 receiving light from the LEDs 61, the light panel 40 will radiate light in a 360 degree fashion around the lighting device 10 when the light panel 40 is in the condition as illustrated in FIG. 7. For example, light emitted from the LEDs 61 are directed to a reflector 46. The light reflects off reflector 46 and is output through the optical elements of the light panel 40. It should be noted that the LEDs 61 may be positioned at angle of 90 degrees from the length of the light panel 40. In one embodiment, light may be output from the surface 49 in the cap 16. In another embodiment, light is not directed out of surface 49 of the cap 16.

When the light panel 40 is in its fully retracted condition as in FIG. 6, if the switch 82 were activated, by use of the switch button 26, the LEDs would still generate light and it is expected that some light will pass through the collimating lens 50 and by the process of reflecting light off the internal portions of the light panel housing 12.1, then light can enter through various surfaces of the light panel 40 and an indication of the light being switched on will be emitted from the surface 49 in the cap 16 when the light is in the closed condition.

Between the cap 14 and the upper rim of the body 12 the respective mating surfaces provide a suitable seal, such as a rain-resistant seal, between the cap 14 and the body 12 so as to make the body generally weatherproof in this region. This seal can be achieved by any known means of interaction between the body cap 14 and the body 12. If the cap 14 were manufactured from a metal such as aluminium the interaction of the flanges can provide the required rain resistance. An advantage of manufacturing the cap 14 from a metal is that it can provide a considerable heat sink for the LED PCB if the circuit characteristics require this.

In the lower region of the body 12, the cap 28 can be manufactured in the same manner or alternatively manufactured from a polymeric material such as the normal moulded plastics utilised for such lighting devices, and the flange arrangements can provide the rain resistance. Alternatively, a sealing gasket can be provided so that the body cap 12 of the base cap 28 will seal to the lower rim of the body 12. The seal can be effected by means of the screw 29 providing appropriate compressive force to the base cap 28 to apply an appropriate force at the rim of the body.

As is illustrated in FIG. 9, in the exploded view, the light panel 40 is seen in its disassembled condition relative to the light panel housing 12.1 and the light panel cap 16. As is best seen from the right side of FIG. 9, the cap 16 has pivot mounts 16.2 which provide an internally threaded aperture to receive the screw pivots 18. The screw pivots 18, which have a threaded portion and a cylindrical surface, secure the handle 20 to the side flanges 44 of the light panel 40 and act as a pivot for which the handle may rotate. As will also be seen on the light panel 40, which has at its upper region a blind aperture 45 that allows the tip 18.1 of the screw 18 to enter into the blind aperture 45 when the light panel is in place inside the shaped aperture 16.1 as illustrated in FIG. 8. This thereby secures the light panel 40 with respect to the cap 16. This will also position the upper edge 49 of the light panel 40 inside the upper edge of the aperture being 16.11, so that it can be sit flush with the upper surface of the cap 16. If desired, a screw fixing of the light panel 40 to the cap 16 can be dispensed with, and the light panel 40 can be adhered to the cap 16, or other locking means provided to prevent their separation once assembled.

As is illustrated in the lower portion of the lighting panel 40, the lighting panel has a shaped protrusion 44.1 on either side at a level approximating the same level as the lateral portion 48 of the lens. The shaped protrusion 44.1 receives an O-ring 44.2 and this O-ring and protrusion 44.1 is able to go into side located grooves 12.5 on either side of the light panel housing 12.1 in the main body 12. The O-ring 44.2, by contacting the sides of the channels 12.5, provides a continuous friction generator when the light panel 40 is moving relative to the body 12. This friction will allow the light panel to remain at whatever position the light panel has been extended to, including once the light panel has been fully extended to the limit of its travel. A travel limiter, which limits the travel of the light panel, can be dictated by any desired mechanism. For example, travel may be limited by the lateral portion 48 engaging an under surface of the cap 14 or alternatively by a "push past" detent as described above. Alternatively a detent can be provided to engaging the upper periphery of the O-ring 44.2 to thereby prevent any further upward travel of the light panel 40 relative to the body 12.

As is best illustrated in the left hand side of FIG. 9, the base 28 can be joined by a decorative ring 28.1, which remains attached to the base cap 28 when the base cape 28 is removed from the body 12. If desired, the ring 28.1 can be replaced by a seal or gasket to assist with the sealing of the cap 28 to the base 12.

Figure 13:
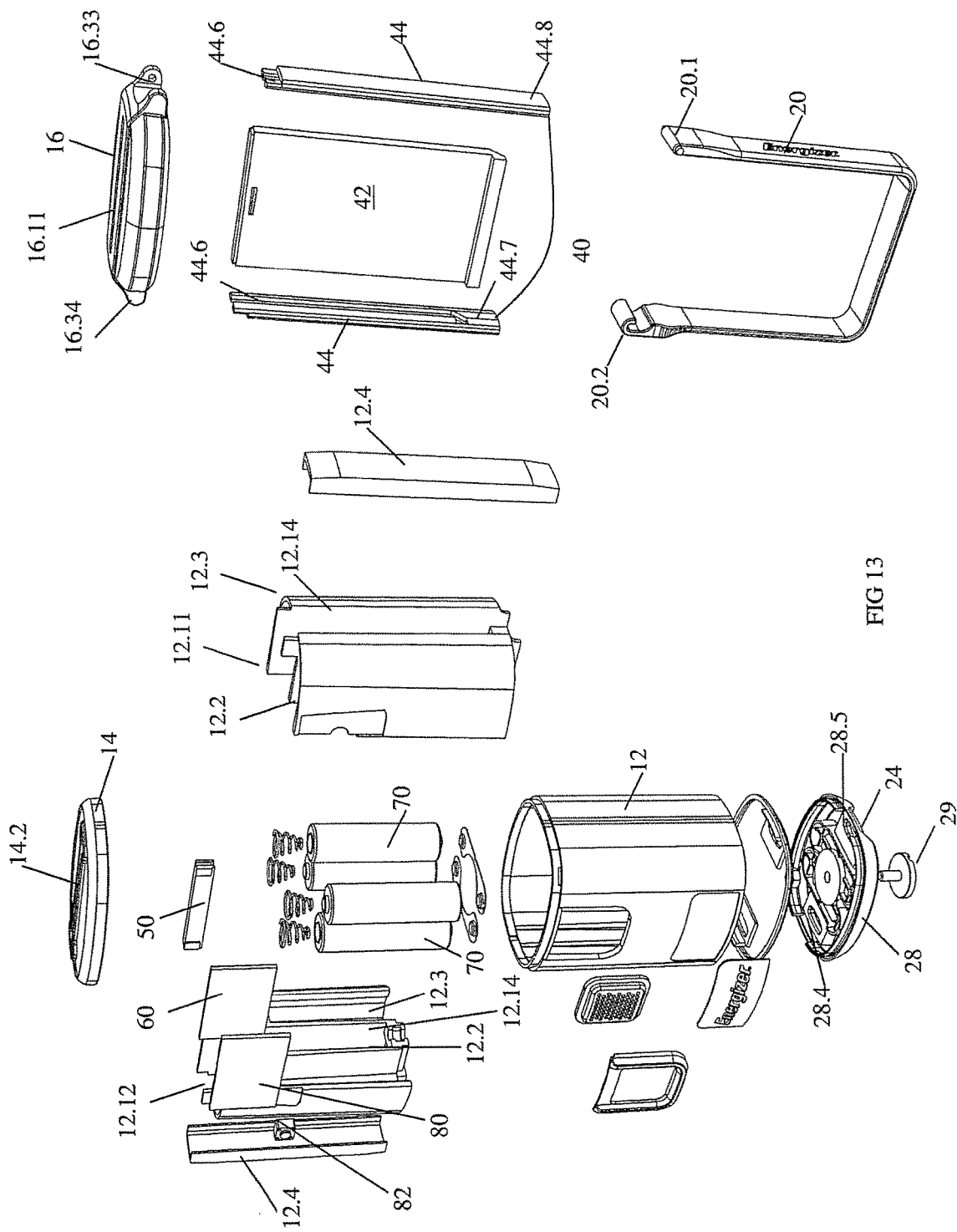
FIG. 13 illustrates a lighting device similar to that of FIGS. 1 to 9, with a modified construction method.

Illustrated in FIG. 13 is a lighting device 110, which is similar to the lighting device 10 of previous figures, and like parts have been like numbered. The lighting device 110 has several differences in construction and operation to that of the device 10, and these will now be described.

The handle 20 is secured, by means of an integrally formed pivot 20.1, at one end to the cap 16 where there is located pivot yoke 16.33. The other side of the handle 20 has a hooked end 20.2 for connection to the other side of the cap 16, where there is locate a pivot pin mount 16.34. By this mechanism, a user may detach the hooked end 20.2 to open the lantern lighting device 110, so that the cap 16 can move away from the cap 14, and then the hooked end 20.2 can be hooked back onto the pivot pin mount 16.34, so as to carry the device 110 as a lantern. When in the transport mode, the handle 20 may be again unhooked by releasing hook 20.2 from pivot pin mount 16.34. The light panel cap 16 is pushed towards the cap 14, the handle 20 wrapped underneath the body 12 and secured to the cap 16 by re-attaching the hooked end 20.2 to pivot pin mount 16.34, thereby securing the device 110 in the transport mode.

Another difference between the device 110 and device 10, is that the light panel housing 12.1 and the battery housing 12.2 and 12.3, are formed from two halves 12.11 and 12.12, which are inserted in the hollow body 12 to form the light panel housing 12.1, as well as the battery housings 12.2 and 12.3. Instead of the channels 12.4 being provided as part of the body 12 moulding, separate nylon channel members 12.4 are provided which sit in a void 12.14 between the bifurcated portions (which form the battery housings 12.2 and 12.3) of the halves 12.11 and 12.12. The channels 12.4 extend the full height of the body 12. The flanges 44 of the light panel 40 slide in side these channels 12.4.

A further difference is that the light panel 40 is not integrally moulded with the flanges 44. Instead the flanges 44 are separately moulded and with a shaped groove 44.6 on their inboard sides so as to receive and mount the profile of the sides of the generally planar portion 42 of the light panel 40.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

The invention has been described with reference to the preferred embodiments. Of course, modifications and alterations will occur to others upon reading and understanding the preceding description. It is intended that the invention be construed as including all such modifications and alterations insofar as they come with the scope of the appended claims and their equivalents.

What is claimed is:

1. A lighting panel for a portable lighting device, the lighting panel comprising:
   a substrate having a pair of at least substantially planar surfaces collectively defining a base edge at least substantially perpendicular to the pair of at least substantially planar surfaces and wherein the pair of at least substantially planar surfaces extends between at least substantially parallel flanges, and wherein:
      the pair of at least substantially planar surfaces are configured to output light received from an associated light source,
      the substrate includes a curved input surface for receiving light from the associated light source and a curved reflective surface for reflecting the received light to the pair of at least substantially planar surfaces,
      each of the at least substantially parallel flanges extend beyond the curved reflective surface and are configured to couple to a body configured to facilitate the light panel between a transport mode and a use mode and secure a power source and the associated light source and
      at least one of the pair of at least substantially planar surfaces includes an etching formation in which a plurality of individual markings each having gradually increasing diameters or depths across all of said at least one of the pair of at least substantially planar surfaces.

2. The lighting panel of claim 1, wherein the curved input surface includes a central portion having a tangent that is at least substantially parallel to the pair of planar surfaces.

3. The lighting panel of claim 1, wherein the curved input surface is configured to receive collimated light.

4. The lighting panel of claim 1, wherein the individual markings are smallest along a portion of the at least one of the pair of at least substantially planar surfaces immediately proximate to the curved input surface as compared to the individual markings along a portion of the at least one of the pair of at least substantially planar surfaces distally disposed from the curved input surface.

5. The lighting panel of claim 4, wherein the individual markings each comprise an individual cylinder.

6. The lighting panel of claim 5, wherein the individual cylinders are arranged in rows in which all of the individual cylinders in a given row have identical diameters or depths.

7. The lighting panel of claim 6, wherein all of the individual cylinders in at least two adjacent rows have identical diameters or depths.

8. The lighting panel of claim 6, wherein all of the rows are spaced apart evenly along the planar surface.

9. The lighting panel of claim 1, wherein the at least substantially parallel flanges extend beyond the pair of at least substantially planar surfaces in a direction at least substantially perpendicular to the pair of at least substantially planar surfaces.

10. The lighting panel of claim 1, wherein the curved reflective surfaces comprises a reflective coating.

* * * * *